US009047801B2

(12) United States Patent
Tanizoe et al.

(10) Patent No.: US 9,047,801 B2
(45) Date of Patent: Jun. 2, 2015

(54) METHOD OF REMOTELY ADJUSTING DISPLAY DEVICE AND DISPLAY DEVICE

(75) Inventors: Hideki Tanizoe, Tokyo (JP); Hiroki Iwataka, Hyogo (JP); Miyuki Tachibana, Tokyo (JP); Yasuhiro Arakawa, Tokyo (JP); Kazuaki Takamoto, Tokyo (JP); Takashi Katagiri, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 1244 days.

(21) Appl. No.: 10/162,663

(22) Filed: Jun. 6, 2002

(65) Prior Publication Data

US 2003/0001829 A1 Jan. 2, 2003

(30) Foreign Application Priority Data

Jun. 18, 2001 (JP) ................................ P2001-183549

(51) Int. Cl.
*G06F 3/048* (2013.01)
*G09G 5/00* (2006.01)

(52) U.S. Cl.
CPC .......... *G09G 5/006* (2013.01); *G09G 2370/047* (2013.01)

(58) Field of Classification Search
CPC . A61N 1/37282; G06F 9/45533; G06F 3/147; G09G 5/006; G09G 2370/047
USPC .................. 715/526, 733, 746, 771, 773, 866
See application file for complete search history.

(56) References Cited

U.S. PATENT DOCUMENTS

2002/0103832 A1* 8/2002 Howarth ........................ 707/526
2002/0165881 A1* 11/2002 Shelton .......................... 707/526

FOREIGN PATENT DOCUMENTS

KR 1999-010134 A 2/1999
KR 1999-0057087 A 7/1999

OTHER PUBLICATIONS

VESA Display Data Channel Command Interface (DDC/CI) Standard Version 1, Aug. 14, 1998, p. 17.
ACCESS.bus Monitor Device Protocol Specification version 3.0, ACCESS.bus Industry group, Section 7, pp. 7-1-7-25, Sep. 1995.

* cited by examiner

*Primary Examiner* — Namitha Pillai
(74) *Attorney, Agent, or Firm* — Birch, Stewart, Kolasch & Birch, LLP

(57) ABSTRACT

A method of remotely adjusting a display device is provided which introduces the concept of Pages as a superordinate concept of VCPs known as control or adjustment item codes under current standards, defines the maximum value of the VCP Pages, and controls the VCP Pages from a personal computer, thereby to define and control more VCPs.

9 Claims, 8 Drawing Sheets

F / G. 6

METHOD OF REMOTELY ADJUSTING DISPLAY DEVICE AND DISPLAY DEVICE

BACKGROUND OF THE INVENTION

1. Field of the Invention

The present invention relates to a technique in which a host computer such as a personal computer remotely adjusts a display device or a display monitor connected to the host computer.

2. Description of the Background Art

Known communication technology for adjusting a display monitor remotely from a personal computer (referred to hereinafter as a PC) includes DDC2AB and DCC2BI standards defined by U.S. VESA (Video Electronics Standards Association).

The DDC2AB standard conforms to ACCESS BUS SPEC Ver. 3.0 defined by U.S. ACCESS BUS INDUSTRY GROUP. Under this standard, three signal lines, SDA (Serial Data), SCL (Serial Clock) and GND, are used to transmit commands bidirectionally between the display monitor and the PC. These three signal lines have already been used under VESA DDC2B standard intended for plug and play, and the base protocol thereof conforms to Philips $I^2C$ BUS standard. The DDC2B standard is currently used in most PCs and display monitors.

The DDC2BI standard appeared as a subset of the DDC2AB standard, and has a difference to be described below from the DDC2AB standard.

The DDC2AB standard: Both of the PC and the display monitor operate in each of $I^2C$ bus master and slave modes.

The DDC2BI standard: The PC always operates only in the $I^2C$ bus master mode, and the display monitor operates only in the slave mode.

This creates a large difference to be described below. For the DDC2AB standard which is premised on a multi-master configuration (or a configuration having a plurality of master devices), it is necessary to mount software or hardware for processing such as contention control and the like in each device in order to control the contention between the masters and to support other devices (e.g., a mouse and a keyboard) than the display monitor. For the DDC2BI standard, on the other hand, the contention control is not required since the PC is always the master and the display monitor is always the slave. This simplifies the software and hardware configurations in the PC and the display monitor. For this reason, a large number of DDC2BI-compliant display monitor products are placed on the market at present.

A method of controlling or adjusting the display monitor from the PC based on the DDC2BI standard will be described.

The DDC2BI standard uses a table containing coded control or adjustment items known as VCPs (Virtual Control Panels). The control or adjustment items referred to herein include standardized items related to display monitor screen adjustments such as contrast, brightness, screen position, size and distortion, and related to operation control such as demagnetization, adjustment data storage, gamma characteristic, reset to factory-adjusted conditions. The table also contains an area allocated to define a manufacturer-specific function. The details of these are defined by VESA MCCS (Monitor Control Command Set) standard. The DDC2BI standard basically references the MCCS standard. Some additional definitions are appended in VESA specs (DDC/CI or Display Data Channel Command Interface) which define the MCCS standard.

The VCP is defined also by the aforementioned ACCESS BUS standard and the USB (Universal Serial Bus) standard. A maximum of 256 items ranging from 00h to FFh are definable in the current VCP table. Since the VCP table has reserved areas for use by standard commands, individual manufacturers can freely define and use only 32 areas ranging from E0h to FFh according to the MCCS specs.

For application of the VCP, the DDC2BI standard specifies the following commands:

1) Get VCP Feature

This command from the PC to the display monitor requests the display monitor to send a maximum adjustment data value and a current setting of a specified adjustment item (VCP or Virtual Control Panel) to the PC.

2) VCP Feature Reply

This command is sent from the display monitor to the PC in reply to the Get VCP Feature command and includes information about the maximum adjustment data value and the current setting of the VCP specified by the Get VCP Feature.

3) Set VCP Feature

This command from the PC to the display monitor sets an adjustment data value of the specified adjustment item (VCP or Virtual Control Panel).

4) Save Current Settings

This command from the PC to the display monitor instructs the display monitor to store the current adjustment data in a memory device (EEPROM or the like) in the display monitor.

5) Capabilities Request

This command from the PC to the display monitor requests the display monitor to send a list of VCPs supported by the display monitor and other information to the PC.

6) Capabilities Reply

This command is sent from the display monitor to the PC and includes a response to the Capabilities Request command.

7) Get Timing Report

This command from the PC to the display monitor requests the display monitor to provide information related to timing (frequencies and polarities of horizontal and vertical sync signals) during operation to the PC.

8) Timing Report

This command is sent from the display monitor to the PC and includes a response to the Get Timing Report command (or informs the PC about the frequencies and polarities of the horizontal and vertical sync signals).

An example of operation of an actual application using the above-mentioned commands will be described.

FIGS. 7 and 8 are flowcharts showing part of the operation of an application in the PC. FIG. 9 is a flowchart showing part of the operation of software in the display monitor.

Referring first to FIG. 7, the PC sends the Capabilities Request command to the display monitor in order to identify VCPs supported by the display monitor (Step ST1). Upon receipt of the Capabilities Request command, the display monitor judges that the answer to Step ST20 of FIG. 9 is Yes, and sends, in reply, corresponding VCP codes in ASCII format to the PC in the process of Step ST21. The PC receives a list of the VCP codes supported by the display monitor in the Capabilities Reply receiving process of Step ST2.

Next, the PC sends the Get Timing Report command to the display monitor in Step ST3. Upon receipt of the Get Timing Report command, the display monitor judges that the answer to Step ST22 of FIG. 9 is Yes, and sends in reply the Timing Report to the PC in the process of Step ST23. The PC receives the Timing Report in Step ST4 to receive information about frequencies of horizontal and vertical sync signals at which the display monitor operate and their polarities.

Next, based on the VCP support information received in Steps ST1 and ST2, the PC sends the Get VCP Feature command and receives the VCP Feature Reply for all of the supported VCPs in Steps ST5 to ST7. Then, the display monitor performs corresponding processes in Steps ST24 and ST25.

In Step ST8, the PC performs the process of drawing or creating a control panel screen of a predetermined design for user's external manipulation by means of a mouse and a keyboard. At this time, an item icon and a slide bar are displayed in accordance with the read VCP item and the adjustment data.

In Step ST9, the PC processes an input manipulated by a user by means of the mouse and the keyboard connected to the PC. As a result, if a request occurs for change in adjustment data such as manipulation of the slide bar, the judgment in Step ST10 is Yes. Then, the PC starts a Set VCP Feature command process in Step ST11 to send the Set VCP Feature command to the display monitor. Then, the display monitor recognizes the receipt of the Set VCP Feature command in Step ST26, and changes the internal adjustment data in Step ST27.

If a request to store the adjustment data occurs in Step ST12, the PC starts a Save Current Settings process in Step ST13 to send the Save Current Settings command to the display monitor. Then, the display monitor recognizes the receipt of the Save Current Settings command in Step ST28, and stores the internal adjustment data in an internal memory device (EEPROM or the like) in Step ST29.

In Steps ST14 and ST15, the PC sends the Get Timing Report command and receives the Timing Report command again to monitor the operation timing of the display monitor at regular time intervals (Step ST16). If a change occurs in the operation timing, there is a great possibility that the adjustment data is changed at the same time. Then, the process returns to Step ST5 wherein the PC reads all adjustment data again and repeats its subsequent processes. If it is judged that no change occurs in the operation timing in Step ST16, the process returns to Step ST8, and the PC repeats its subsequent processes.

In the background art DDC2BI-compliant system, individual manufacturers can freely define and use only 32 areas ranging from E0h to FFh in the VCP table, as described above. However, demands have been on the increase for addition of new functions to recent display monitors. For instance, the introduction of digital convergence adjustment and high-precision distortion correction in high-resolution CRT displays allows locally fine adjustments of the screen. There is another demand for adjustment of sound quality and volume and the like resulting from the transmission of an audio signal. Thus, a shortage of the present-day manufacturer-definable areas arises. In this manner, more and more devices are required to expand the VCP table (or cannot meet the demands without the expansion). However, simple VCP expansion, for example, up to 0000-FFFFh will eliminate compatibility with the present standards and therefore be problematic.

Some devices can operate sufficiently with the existing VCP areas. Such devices are adaptable at low costs by managing only the VCPs under the existing standards. Thus, not all devices require the expansion; some require the expansion and others do not.

At present, the DDC2BI standard is also used in some cases when the devices are factory-adjusted. Among factory-adjustable-only items are some items which will cause trouble when accessed by a user. A clear distinction should be made between factory-adjustable items and user-accessible items (open to users). It is risky that the factory-adjustable VCPs use a VCP area (currently available area) which would be defined by the VESA standard in the future. On the other hand, many vendor-defined areas are used for user access, and there is always a shortage of the user-accessible areas, as mentioned above. It is hence also necessary to reserve the factory-adjustable-only VCP areas.

SUMMARY OF THE INVENTION

It is an object of the present invention to provide a method of remotely adjusting a display device which is capable of easily and freely expanding VCP areas depending upon the application thereof while maintaining compatibility with systems under current standards.

The present invention is intended for an expanded method of adjusting a display device remotely from a computer according to a predetermined standard, the predetermined standard having a control item code group, there being previously defined superordinate codes associated respectively with a plurality of control item code groups including the control item code group of the predetermined standard. The method includes the following steps (a) and (b).

The step (a) is to specify at least one of the superordinate codes between the computer and the display device. The step (b) is to adjust the display device remotely from the computer by using at least one control item code group associated with the at least one specified superordinate code.

The method according to the present invention can easily expand the control item codes while maintaining compatibility with the predetermined standard.

Preferably, in the method, the step (a) includes the steps of: (a-1) sending a command for reading the superordinate codes from the computer to the display device; and (a-2) judging that the display device is inadaptable to expansion if no reply to the command is sent from the display device.

The method can suitably deal with display devices inadaptable to expansion.

Preferably, in the method, the step (a) includes the steps of: (a-1) sending a command for reading the superordinate codes from the computer to the display device; and (a-2) sending at least one of an upper limit and a lower limit of a variable range of the superordinate codes from the display device to the computer.

The method can avoid a malfunction resulting from expansion beyond the variable range of the superordinate codes.

Preferably, in the method, a specific value of the superordinate codes is defined for factory-adjustable use. The method further includes the step of (c) resetting the superordinate codes to a value different from the specific value in the display device when a default condition occurs.

The method can effectively prevent user access to a factory-adjustable superordinate code to protect factory-adjustable control item codes.

Preferably, in the method, the step (a) further includes the step of (a-3) ignoring in the display device a superordinate code outside the at least one of the upper and lower limits of the variable range of the superordinate codes if the display device is instructed by the computer about the superordinate code outside the at least one of the upper and lower limits.

The method can avoid a malfunction resulting from expansion beyond the variable range of the superordinate codes.

Preferably, in the method, the step (a) includes the steps of: (a-1) providing an instruction about a value of the superordinate codes from the computer to the display device; and (a-2) sending the value in reply from the display device to the computer.

The method can perform the remote adjustment more safely.

Preferably, in the method, the step (a) includes the steps of: (a-1) sending a command for inquiry about an adjustment item support state including support for the superordinate codes from the computer to the display device; (a-2) sending a reply command from the display device to the computer; and (a-3) judging that the display device is inadaptable to expansion if the reply command does not include the superordinate codes.

The method can suitably deal with display devices inadaptable to expansion.

The present invention is also intended for an expanded method of adjusting a display device remotely from a computer according to a predetermined standard, the predetermined standard having a control item code group, there being a plurality of pages prepared in such a manner that the control item code group of the predetermined standard is assigned to one of the plurality of pages and other control item code groups are assignable respectively to the remainder of the plurality of pages. The method includes the following steps (a) and (b).

The step (a) is to specify at least one of the plurality of pages between the computer and the display device. The step (b) is to adjust the display device remotely from the computer by using at least one control item code group assigned to the at least one specified page.

The method according to the present invention can easily expand the control item codes while maintaining compatibility with the predetermined standard.

The present invention is also intended for a display device capable of being adjusted remotely from a computer by any method as recited above.

The display device can easily expand the control item codes while maintaining compatibility with the predetermined standard to allow the computer to perform the remote adjustment.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
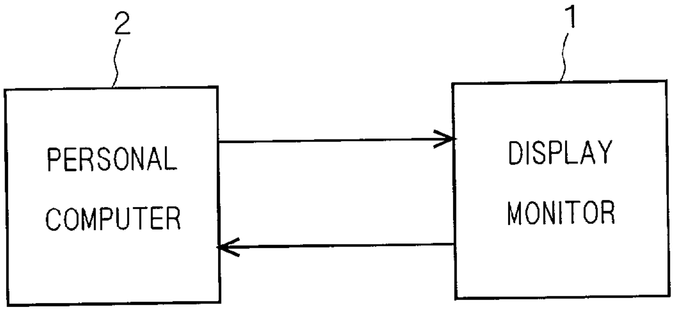
FIG. 1 is a diagram showing a system in which an expanded remote adjustment is practiced according to the present invention.

FIG. 1 is a diagram showing an example of a system in which a method of remotely adjusting a display device is practiced according to the present invention. The system comprises a display monitor 1 and a personal computer (PC) 2. The PC 2 is connected to the display monitor 1 and remotely adjusts the display monitor 1. Communication technology basically used herein for remote adjustment is a known standard, for example, the DDC2BI standard. As stated previously, the DDC2BI standard uses a VCP table containing coded control or adjustment items. A maximum of 256 control or adjustment items (VCPs) ranging from 00h to FFh are definable in the VCP table. According to the present invention, the number of definable items in the VCP table is expanded up to 256×256 while compatibility with the underlying standard (in this case, the DDC2BI standard) is maintained.

Figure 2:
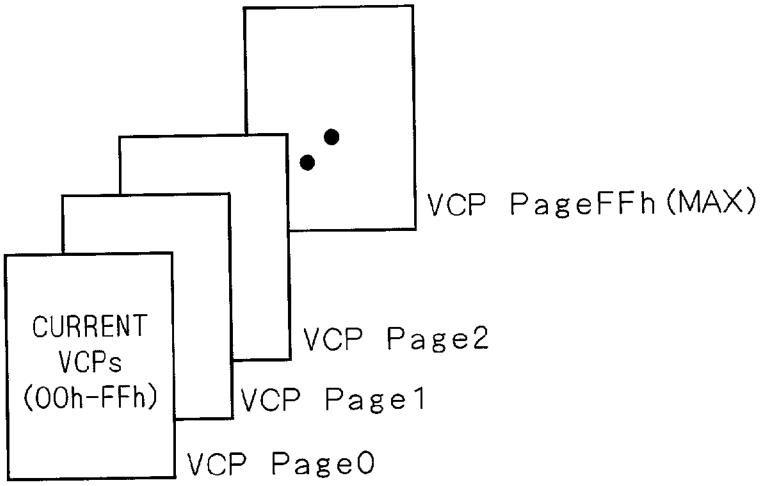
FIG. 2 schematically shows a VCP expansion method using the concept of VCP Pages according to the present invention.

FIG. 2 shows a VCP expansion method according to a first preferred embodiment of the present invention. Referring to FIG. 2, each VCP Page is a page conforming to the DDC2BI standard and consisting of a group of 256 VCPs. The first preferred embodiment, in which one page is defined as one byte, is capable of defining 256 groups of VCPs, that is, 256×256=65536 VCPs.

Specifically, the VCP expansion method according to the present invention introduces the concept of Pages as a superordinate concept of the current VCPs, defines the maximum value (VCPP MAX) of the VCP Pages, and controls the VCP Pages from the PC, thereby to define and control more VCPs. On VCP Page 0 shall be standard VCPs defined by the VESA MCCS and exactly identical with those of the background art. On VCP Page 1 shall be an area reserved for future VESA standards. On VCP Pages 2 to MAX (the maximum Page) shall be areas for use by a manufacturer. In particular, the maximum VCP Page (VCPP=MAX) for use by the manufacturer shall always be used as a factory-adjustable page.

The commands 1) to 8) are specified in the DDC2BI standard, as mentioned above. In addition to these commands, the present invention specifies the following new commands:

9) Set VCP Page

This command from the PC to the display monitor specifies a value of the VCP Pages. The specified VCP Page is not stored in an internal memory device in the display monitor, but is reset to a value, e.g. "0," other than MAX whenever a default condition occurs, for example, at power on/off of the display monitor or whenever anomalies are handled, for example, if a built-in microcomputer in the display monitor is out of control. This limits access to the factory-adjustable control or adjustment items to protect factory-adjustable data. Setting the default Page at "0" allows compatibility to be easily maintained with the existing standard (in this case, the DDC2BI standard) to be applied.

10) Get VCP Page

This command from the PC to the display monitor requests the display monitor to send a setting of the VCP Page in the display monitor to the PC.

11) VCP Page Reply

This command is sent from the display monitor to the PC in reply to the Get VCP Page command and includes the setting of the VCP Page.

The commands 10) and 11) allow the PC to recognize the setting of the VCP Page in the display monitor. If the reply to the Get VCP Page command does not come from the display monitor to the PC, the operation according to the first preferred embodiment is carried out on the assumption that the display monitor supports only the VCP Page 0 (or is not adaptable to the expansion). Therefore, the first preferred embodiment is adaptable for an unexpandable system compliant with only the existing VCPs.

Description will be given on an example of the operation of an actual application using the commands 9) to 11) and the previously stated commands 1) to 8) specified in the DDC2BI standard.

Figure 3:
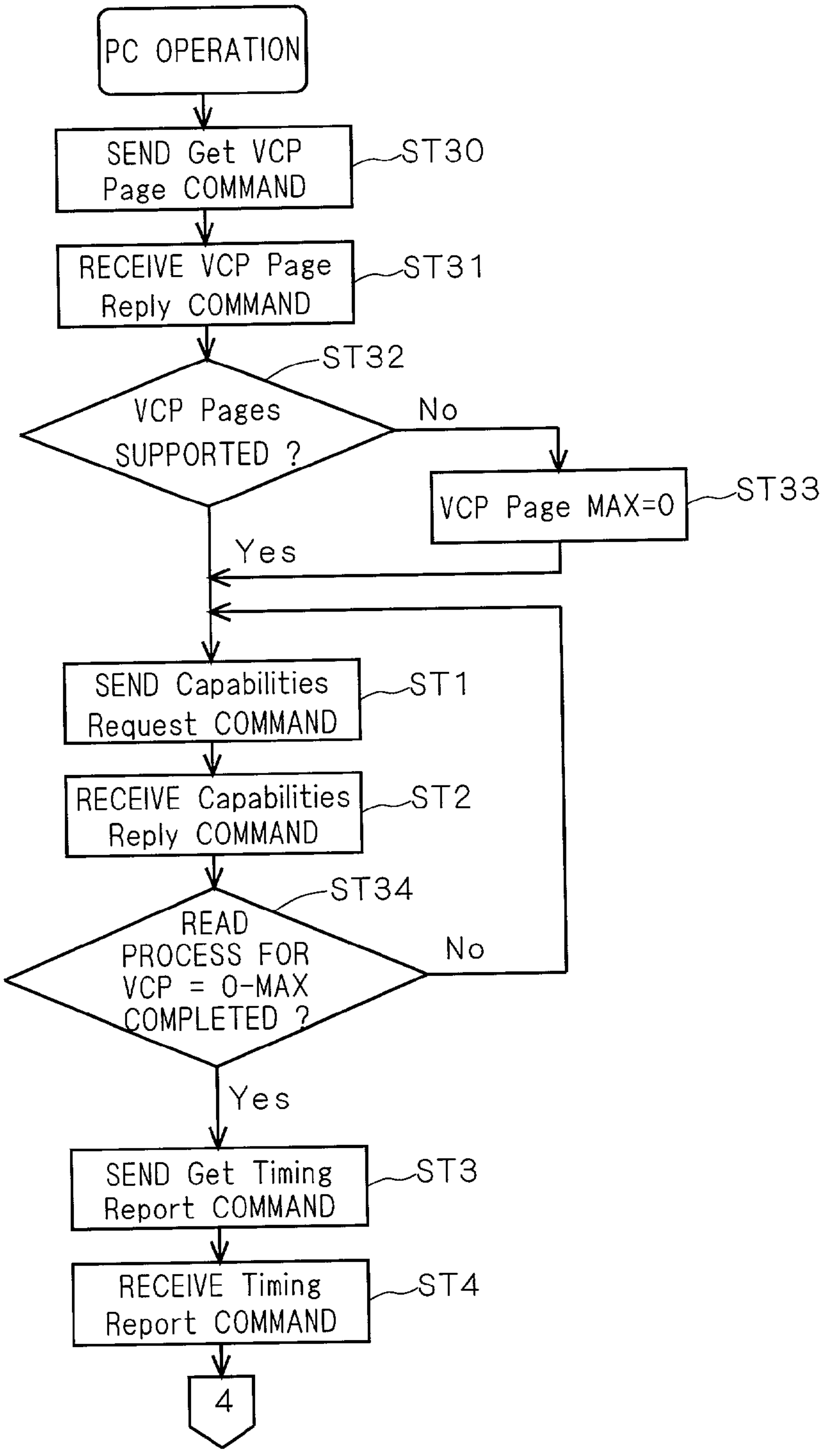
FIGS. 3 through 5 are flowcharts showing part of the operation of an application in a PC according to the present invention.
Figure 4:
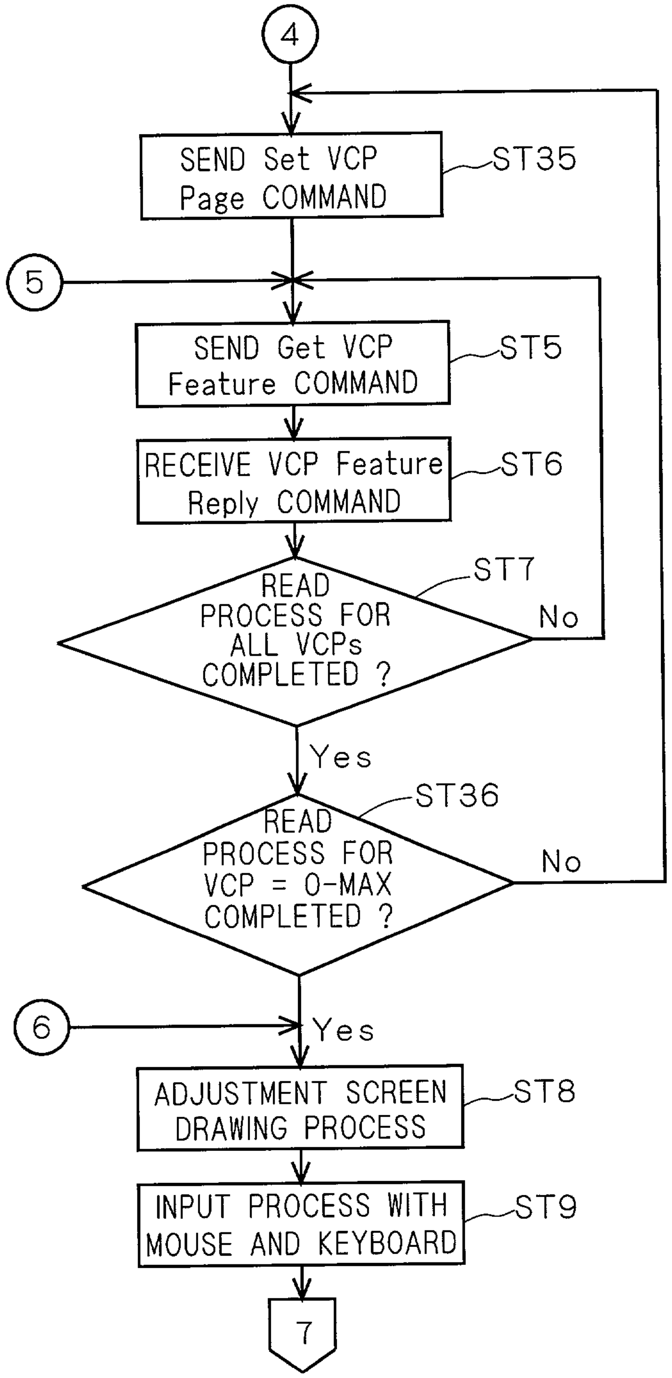
Figure 5:
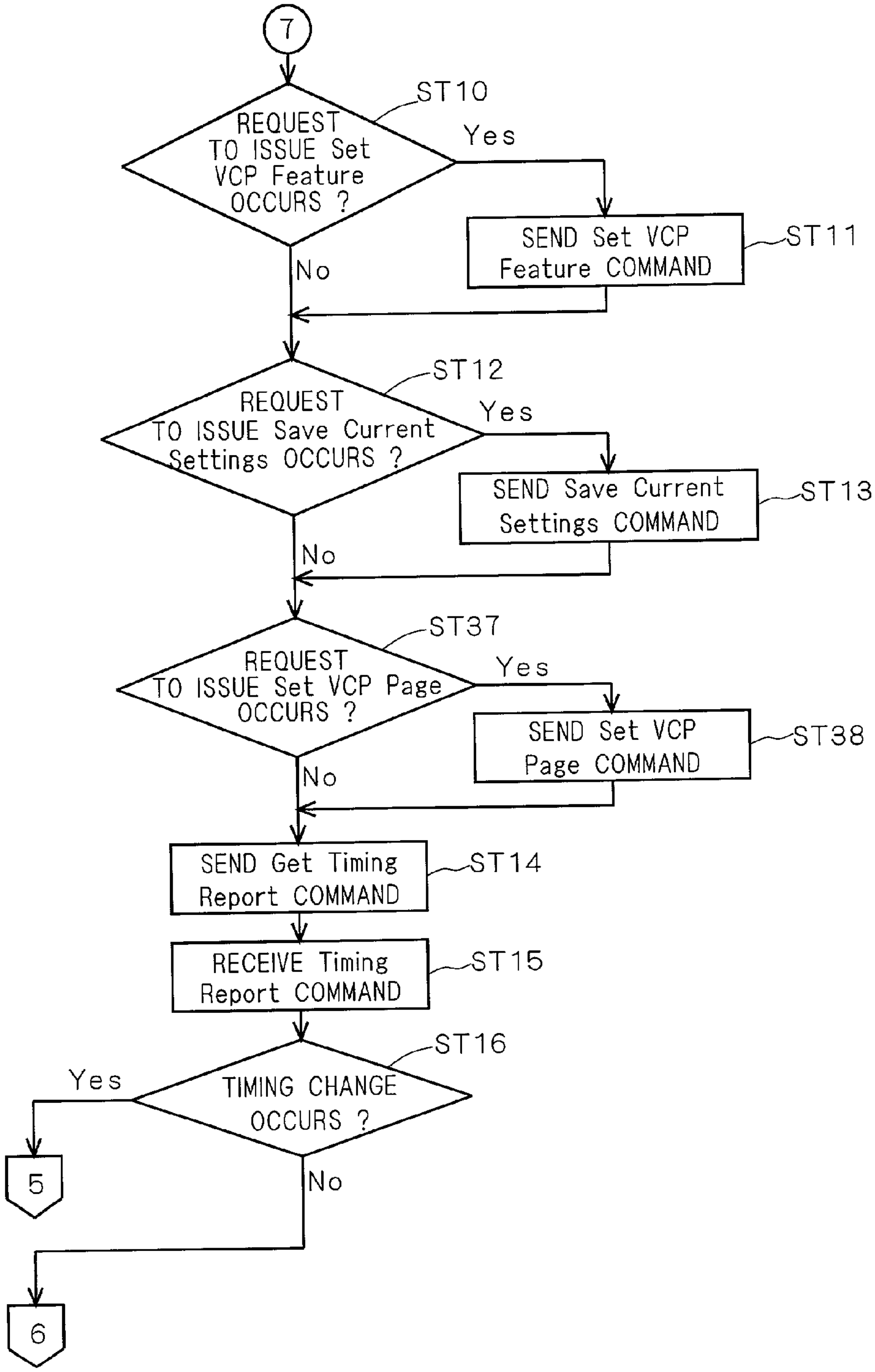
Figure 6:
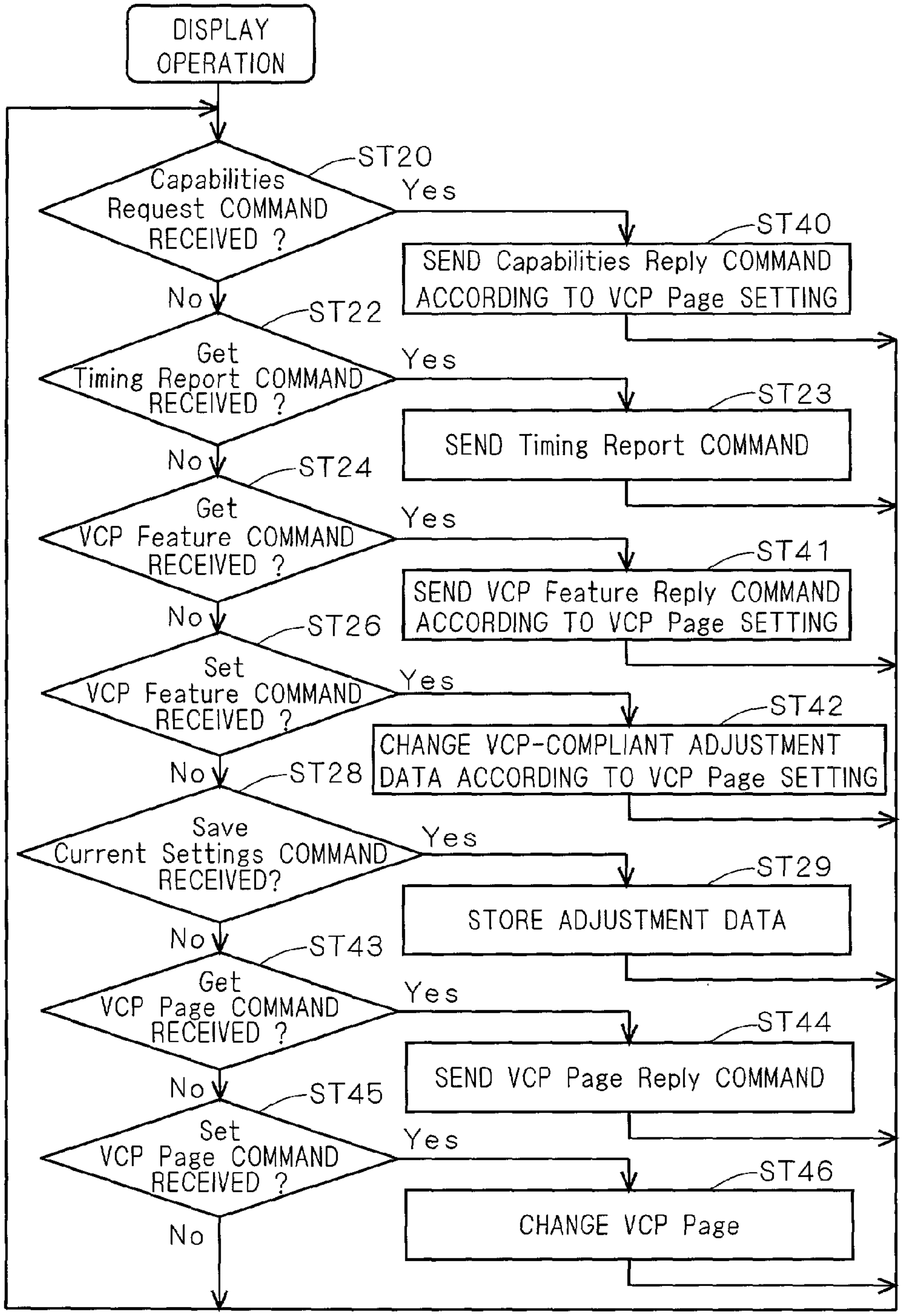
FIG. 6 is a flowchart showing part of the operation of software in a display monitor according to the present invention.
Figure 7:
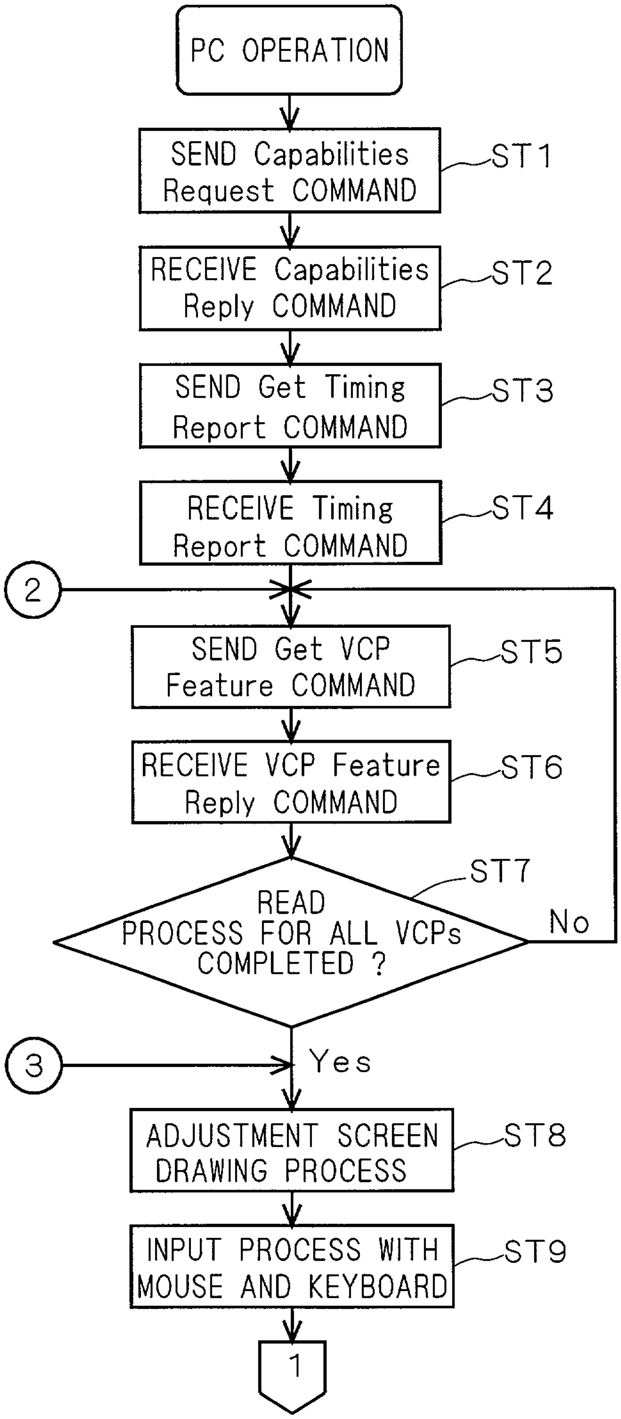
FIGS. 7 and 8 are flowcharts showing part of the operation of an application in a PC in the background art.
Figure 8:
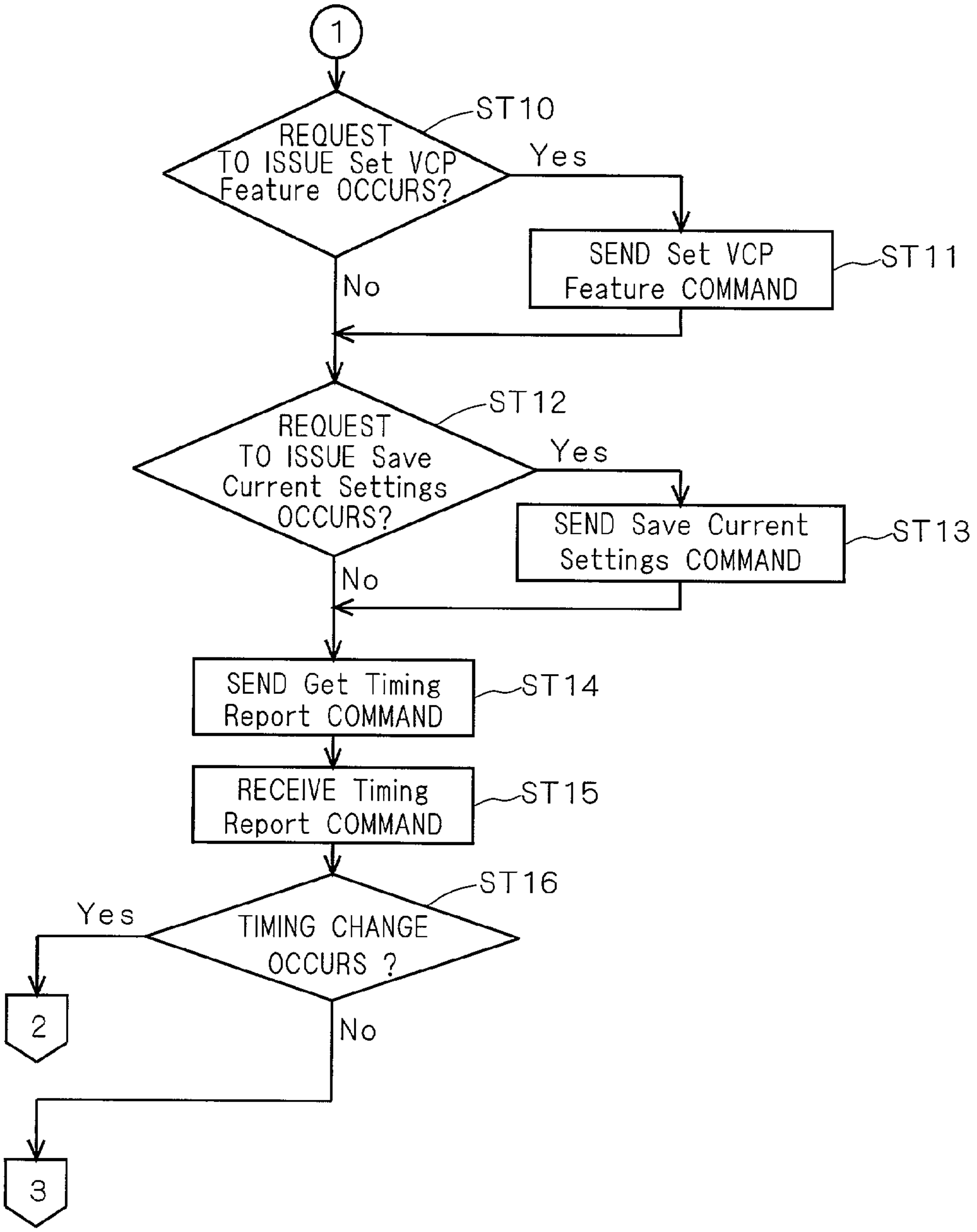
Figure 9:
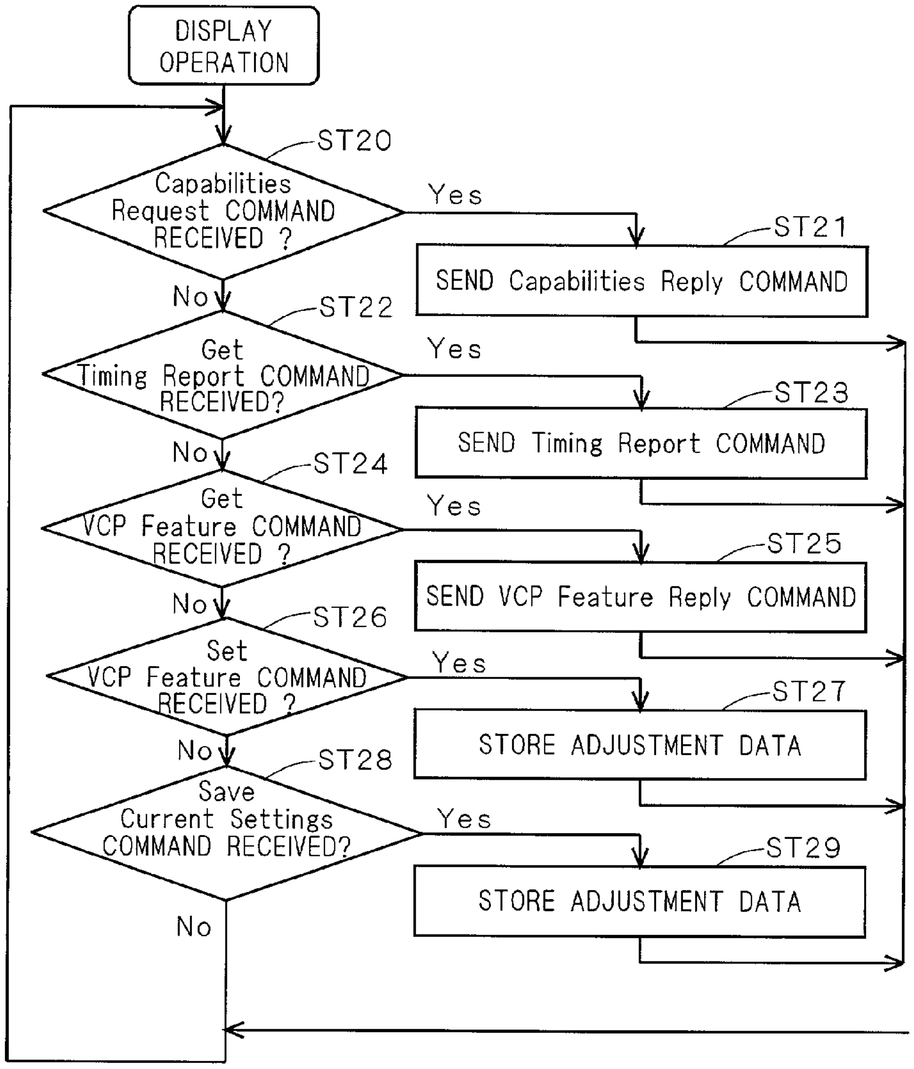
FIG. 9 is a flowchart showing part of the operation of software in a display monitor in the background art.

FIGS. 3 through 5 are flowcharts showing part of the operation of the application in the PC which supports the VCP Pages. FIG. 6 is a flowchart showing part of the operation of software in the display monitor which supports the VCP Pages. The same reference characters beginning with the letters "ST" are used to designate process steps similar in processing to the background art process steps shown in FIGS. 7 through 9.

First, in Step ST30 of FIG. 3, the PC sends the Get VCP Page command to the display monitor. Then, if the display monitor supports the VCP Pages, the display monitor detects the Get VCP Page command in Step ST43 of FIG. 6, and sends the VCP Page Reply in Step ST44. The VCP Page Reply includes VCPP MAX (the maximum value of the VCP Pages). Although the minimum value of the VCP Pages is defined as "0" according to the first preferred embodiment, the minimum value is also included in the VCP Page Reply if the minimum value is variable. Thus, the VCP Page Reply includes the maximum value and/or minimum value of the VCP Pages.

Next, the PC receives the VCP Page Reply command in Step ST31 of FIG. 3. As a result, if the VCP Page Reply is received normally, the PC judges that support for the VCP Pages is provided in Step ST32, and sets the maximum value of the VCP Pages to the received value of VCPP MAX. If the PC judges that support for the VCP Pages is not provided in Step ST32 (or if the VCP Page Reply is not normally received, for example, no reply is received), the PC sets the maximum value of VCP Pages to "0."

Next, in Step ST1 of FIG. 3, the PC sends the Capabilities Request command to the display monitor. If the display monitor detects the Capabilities Request command in Step ST20 of FIG. 6, the display monitor sends the Capabilities Reply command to the PC in accordance with VCP Page setting conditions in Step S40. Specifically, since the display monitor provides different VCP supports depending on the value of the VCP Pages, the display monitor informs the PC about information in accordance therewith.

In Step ST2 of FIG. 3, the PC receives the Capabilities Reply command. Thereafter, in Step ST34, the PC verifies whether the Capabilities Request has been made for all Pages ranging from VCP=0 to MAX, and repeats the read process while changing Pages from 0 to MAX.

Next, in Step ST3 of FIG. 3, the PC sends the Get Timing Report command to the display monitor in a conventional manner. Upon receipt of the Get Timing Report command, the display monitor judges that the answer to Step ST22 of FIG. 6 is Yes, and sends in reply the Timing Report to the PC in the process of Step ST23. The PC receives the Timing Report in Step ST4 to receive information about frequencies of horizontal and vertical sync signals at which the display monitor operate and their polarities.

Next, in Step ST35 of FIG. 4, the PC sends the Set VCP Page command to the display monitor to change the VCP Page in the display monitor. Then, the PC reads data about VCPs on all of the VCP Pages supported by the display monitor in Steps ST5, ST6, ST7 and ST36.

Then, the display monitor makes responses in Steps ST45, ST46 and Steps ST24, ST41 of FIG. 6. Specifically, if the display monitor detects the receipt of the Set VCP Page command in Step ST45, the display monitor changes the VCP Page in Step ST46. If a value exceeding the maximum value of the VCP Pages is specified, the display monitor ignores the value to prevent an abnormal operation. If the display monitor detects the receipt of the Get VCP Feature command in Step ST24, the display monitor sends the adjustment data in reply, based on the VCP definition according to the set VCP Page.

Next, in Step ST8 of FIG. 4, the PC performs the process of drawing or creating a control panel screen of a predetermined design for user's external manipulation by means of a mouse and a keyboard. At this time, an item icon and a slide bar are displayed in accordance with the read VCP item and the adjustment data.

In Step ST9 of FIG. 4, the PC processes an input manipulated by a user by means of the mouse and the keyboard connected to the PC. As a result, if a request occurs for change in adjustment data such as manipulation of the slide bar, the judgment in Step ST10 of FIG. 5 is Yes. Then, the PC starts a Set VCP Feature command process in Step ST11 to send the Set VCP Feature command to the display monitor. Then, the display monitor recognizes the receipt of the Set VCP Feature command in Step ST26 of FIG. 6, and changes the internal adjustment data in Step ST27.

If a request to store the adjustment data occurs in Step ST12 of FIG. 5, the PC starts a Save Current Settings process in Step ST13 to send the Save Current Settings command to the display monitor. Then, the display monitor recognizes the receipt of the Save Current Settings command in Step ST28, and stores the internal adjustment data in an internal memory device (EEPROM or the like) in Step ST29.

There arises a need to change the VCP Page depending on the adjustment items when selecting the VCP and storing the adjustment value as required in Steps ST10, ST11, ST12 and ST13. If there is a request to issue the Set VCP Page, that is, it is desired to access an adjustment item assigned to a Page different from the current VCP Page in Step ST37, the PC sends the Set VCP Page command to the display monitor in Step ST38 to change the VCP Page.

Next, in Steps ST14 and ST15, the PC sends the Get Timing Report command and receives the Timing Report command again to monitor the operation timing of the display monitor at regular time intervals (Step ST16). If a change occurs in the operation timing, there is a great possibility that the adjustment data is changed at the same time. Then, the process returns to Step ST5 wherein the PC reads all adjustment data again and repeats its subsequent processes. If it is judged that no change occurs in the operation timing in Step ST16, the process returns to Step ST8, and the PC repeats its subsequent processes.

In the operation of the display monitor employing the concept of the VCP Pages according to the first preferred embodiment, the display monitor sends, in reply, VCP codes in ASCII format as Capabilities Strings according to the set VCP Page in Step ST40. In the Get VCP Feature command process in Step ST41, the display monitor sends in reply the adjustment data based on the VCP definition according to the set VCP Page. In the Set VCP Feature command process in Step ST42, the display monitor changes the adjustment data based on the VCP definition according to the set VCP Page. When the receipt of the Get VCP Page command is detected in Step ST43, the display monitor uses the VCP Page Reply command to send in reply the VCP Page setting existing at that time in Step ST44. If the receipt of the Set VCP Page command is detected in Step ST45, the display monitor changes the VCP Page from the current one to another in Step ST46. In this step, if the specified value exceeds the maximum value of the VCP Pages, the display monitor ignores the specified value.

The VCP expansion method according to the present invention configured as mentioned hereinabove can achieve the VCP expansion in a safe manner while maintaining complete compatibility with the conventional systems, make a clear distinction between factory-adjustable VCP codes and other VCP codes, and provide a system which is safe even against unintentional power-off of the display monitor or an out-of-control condition of a built-in microcomputer in the display monitor. Further, this method can select between the use and nonuse of the VCP Pages and change the number of Pages to be used when in use for each device to flexibly deal with each device as required.

Second Preferred Embodiment

The VCP Page=MAX is defined as the factory-adjustable page according to the first preferred embodiment. In contrast, any particular VCP Page other than VCP Page=MAX is defined as the factory-adjustable page according to a second preferred embodiment of the present invention. This also produces effects similar to those of the first preferred embodiment.

Third Preferred Embodiment

In the method according to the first preferred embodiment, if the Set VCP Page command received by the display monitor specifies the VCP Page exceeding the maximum value of the VCP Page, the display monitor ignores the command to protect data therein. According to a third preferred embodiment of the present invention, upon receipt of such a command, the display monitor sends in reply the VCP Page Reply command to the PC. The PC receives the VCP Page Reply command and verifies the Page setting condition in the display monitor to prevent an abnormal operation. Thus sending information about the verification of operation allows the construction of a safer system. In this process, the PC can check the display monitor for operation depending on whether or not the same value as specified by the Set VCP Page is sent back to the PC. This provides effects similar to or greater than those of the first preferred embodiment.

Fourth Preferred Embodiment

In order for the PC to know whether or not the display monitor supports the VCP Pages, the PC sends the Get VCP Page command to the display monitor and judges whether or not the support for the VCP Pages is provided based on the resultant reply in the method according to the first preferred embodiment. In contrast, according to a fourth preferred embodiment of the present invention, VCP Page information, in addition to the VCP information sent in reply in the first preferred embodiment, is included in the response (Capabilities Reply) from the display monitor to the Capabilities Request command. This enables the display monitor to inform the PC about whether or not the display monitor supports the VCP Pages. In other words, the PC can judge that the display monitor is not adaptable to the expansion if the VCP Page information is not included in the response (Capabilities Reply). This also produces effects similar to those of the first preferred embodiment.

While the invention has been described in detail, the foregoing description is in all aspects illustrative and not restrictive. It is understood that numerous other modifications and variations can be devised without departing from the scope of the invention.

What is claimed is:

1. An expanded method of adjusting a display device remotely from a computer according to a predetermined standard, said predetermined standard having a control item code group having a maximum number of control item codes, said method comprising the steps of:

expanding the maximum number of control item codes by specifying control item code pages configured such that at least one page includes a control item code group of said predetermined standard and defining a maximum value of the number of pages of said control code pages to increase said control item code pages to said maximum value of the number of pages of said control code pages;

defining at least one command which allows the computer to request the display to send a value corresponding to the page, said page identifying a group of control item codes for adjusting the display device;

(a) specifying at least one of said pages between said computer and said display device; and (b) adjusting said display device remotely from said computer by using at least one control item code group associated with said at least one specified page.

2. The method according to claim 1, wherein said step (a) includes the steps of:

(a-1) sending a command for reading said pages from said computer to said display device; and (a-2) judging that said display device is inadaptable to expansion if no reply to said command is sent from said display device.

3. The method according to claim 1, wherein said step (a) includes the steps of:

(a-1) sending a command for reading said pages from said computer to said display device; and (a-2) sending at least one of an upper limit and a lower limit of a variable range of said pages from said display device to said computer.

4. The method according to claim 3, wherein said step (a) further includes the step of (a-3) ignoring in said display device a page outside said at least one of said upper and lower limits of said variable range of said pages if said display device is instructed by said computer about said page outside said at least one of said upper and lower limits.

5. The method according to claim 1, wherein a specific value of said pages is defined for factory-adjustable use, said method further comprising the step of (c) resetting said pages to a value different from said specific value in said display device when a default condition occurs.

6. The method according to claim 1, wherein said step (a) includes the steps of:

(a-1) providing an instruction about a value of said pages from said computer to said display device; and (a-2) sending said value in reply from said display device to said computer.

7. The method according to claim 1, wherein said step (a) includes the steps of:

(a-1) sending a command for inquiry about an adjustment item support state including support for said pages from said computer to said display device;

(a-2) sending a reply command from said display device to said computer; and (a-3) judging that said display device is inadaptable to expansion if said reply command does not include said pages.

8. An expanded method of adjusting a display device remotely from a computer according to a predetermined standard, said predetermined standard having a maximum number of control items organized into a control item code group, said method comprising the steps of:

expanding the maximum number of control item codes by specifying control item code pages configured such that at least one page includes a control item code group of said predetermined standard and defining a maximum value of the number of pages of said control item code pages to increase said control item code pages to said maximum value of the number of pages of said control code pages in such a manner that said control item code group of said predetermined standard is assigned to one of a plurality of pages and other control item code groups are assignable respectively to the remainder of said plurality of pages, defining at least one command which allows the computer to request the display to send a value corresponding to a page currently set in the display, said page identifying a group of control item codes for adjusting the display device;

(a) specifying at least one of said plurality of pages between said computer and said display device; and (b) adjusting said display device remotely from said computer by using at least one control item code group assigned to said at least one specified page.

9. A display device which is remotely adjusted from a computer according to an expanded number of control item codes and a predetermined standard, said predetermined standard having a control item code group having a maximum number of control item codes, comprising:

means for expanding the maximum number of control item codes by specifying control item code pages configured such that at least one page includes a control item code group of said predetermined standard and defining a maximum value of the number of pages of said control item code pages to increase said control item code pages to said maximum value of the number of pages of said control code pages, at least one page including said control item code group of said predetermined standard;

means for responding to a command with a value corresponding to a page, in order to allow the computer to recognize which page has been set in said display, said page corresponding to said value identifying a group of control item codes for adjusting the display device;

means for specifying at least one of said pages between said computer and said display device; and means for adjusting said display device remotely from said computer by using at least one control item code group associated with said at least one specified page.

* * * * *